INVENTOR.
RICHARD C. SEBERN
- AGENT -

INVENTOR.
RICHARD C. SEBERN

United States Patent Office 3,439,321
Patented Apr. 15, 1969

3,439,321
AIRCRAFT FLIGHT INSTRUMENT FAILURE MONITOR AND WARNING SYSTEM
Richard C. Sebern, Long Beach, Calif., assignor, by mesne assignments, to McDonnell Douglas Corporation, Santa Monica, Calif., a corporation of Maryland
Filed Sept. 20, 1965, Ser. No. 488,464
Int. Cl. G08g 5/00; G08b 21/00
U.S. Cl. 340—27                                6 Claims

ABSTRACT OF THE DISCLOSURE

An aircraft flight instrument failure monitor and warning system including a monitoring device, and an annunciator operatively coupled to the monitoring device. The monitoring device includes failure detection circuits for detecting instrument failures, mode select circuit means coupled to the failure detection circuits for transmitting only those signals which affect the particular mode in which the aircraft is operating, and output circuits connected to the mode select circuit means for transmitting a signal to suggest a corrective aircraft flight procedure to the flight crew in view of each flight instrument failure and display such by means of the annunciator.

---

This invention relates to an improved aircraft flight instrument failure warning and monitoring device. More specifically, this invention relates to a device which serves to monitor all pertinent flight instruments, noting any and all instrument malfunctions, while simultaneously monitoring the particular flight stage (take-off, approach, landing, etc.), and then displaying the malfunction to the flight crew and suggesting a proper or corrective coarse of action.

Modern high-speed aircraft contain numerous electrical instruments for maintaining the aircraft in proper and safe flight. These instruments note conditions internally and externally of the aircraft, the results of which are displayed on instrument gauges. Many of these instruments are absolutely necessary to maintain the aircraft in flight, and a malfunction, if not known, could be disasterous. As a result, several means have been commonly employed to recognize an instrument malfunction and to alert the flight crew. For example, instrument redundancy is used, one set for the pilot side of the aircraft and one set for the copilot side. Also, comparators have been employed to compare a specific instrument reading on the pilot side of the aircraft with the identical instrument reading on the copilot's side. If any deviation occurs therebetween the pilot and copilot are warned of such, thereby being informed of a possible instrument failure in one of the sets of instruments. Further, some instruments incorporate therein a warning device which, upon malfunction of the instrument, a warning means, such as a small flag, light or audio tone becomes noticeable thereby bringing the malfunction to the pilot's and copilot's attention.

There are several disadadvantages to the heretofore employed failure warning systems. First, the flight crew may not immediately notice the particular failure warning if they are not giving their attention to the particular instrument gauge. Second, upon a failure of an instrument on the pilot's side of the aircraft, the pilot is not immediately aware if the duplicated instrument on the copilot's side is operating correctly or also has failed. Third, the failure of an instrument may be brought to the flight crew's attention when the instrument is not being employed which could cause distraction during critical flight periods. Fourth, no means is employed to assist the flight crew in their corrective action.

This invention relates to an improved failure warning system which overcomes the foregoing disadvantages. The failure warning system of the instant invention is employed in addition and supplemental to the presently employed failure warning systems.

During critical periods of flight such as approach and landing phases, the flight crew must be able to recognize a malfunction, decide what corrective action is necessary, and carry out that action. The primary decisions which must be made are whether to continue the approach or execute a go-around maneuver, and whether the pilot or copilot should carry out that action. In any failure situation, the pilot will normally make these decisions. However, both pilot and copilot must be aware of the aircraft condition, particularly since a transfer of the control from pilot to copilot may become necessary. An effective instrument warning and monitoring system provides early recognition of failures, minimizes pilot decision time, gives speicfic indication as to what has failed and reduces pilot workload during normal aircraft operations.

The instrument warning and monitoring system of this invention accomplishes the previous objectives by incorporating the following features: Sense instrument in-line or self-monitored failures to indicate specifically what has failed; attention-compelling displays to alert the flight crew; summarizing the effect of the failure to assist the flight crew in their decision; prominent flags integral with the flight instruments to identify specific failures; avoidance of multiple flags for a single failure; removal of a defective display from view whenever possible; comparator monitoring to supplement the self-monitored equipment; and discrepancy warning from a comparator only when a failure cannot be specifically identified.

Included in the system are a comparator unit, an instrument failure monitor unit and annunciator assemblies.

The inputs to the instrument warning and monitor system include the following: compass system, pitch attitude, bank attitude, localizer receiver, glide slope receiver, radio-altimeter, speed command computer, flight director computer, instrument amplifier, and an automatic pilot. The compass system, pitch and bank attitude, which provide stabilization about the three aircraft control axes, were chosen as subsystems for the warning and monitor system as these are the basic references for the flight crew, the instruments, and the automatic systems. The localizer and glide slope receivers were selected because a failure in any of these represents a loss of reference to a desired path. Comparison of the radio altimeter altitude outputs included in the monitor system as an accurate determination of the altitude is imperative in a low-approach system. It is to be noted that the foregoing inputs are only representative and in no way should limit the instant invention. It is to be understood that different, additional or fewer inputs could be employed without departing from the scope of the invention.

The above introduction states the general objectives of the invention and presents a brief summary of the problems for which the invention provides a solution. Further objects of the invention, and a better understanding of the details thereof, may be obtained in the annexed description taken in connection with the drawings in which similar reference numerals indicate similar parts and in which.

Figure 1:
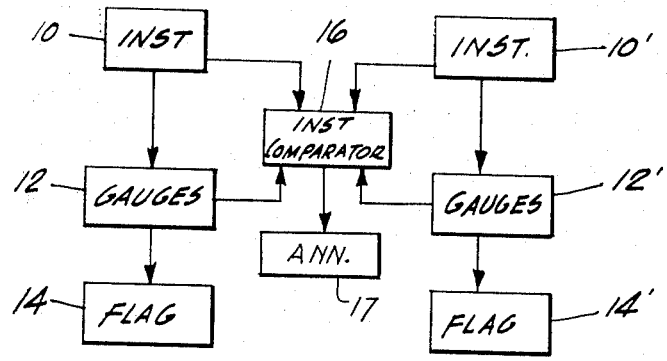
FIGURE 1 is a block diagram of a typical instrument failure warning device.

Referring particularly to the drawings, FIGURE 1 shows the duplicated flight instrument 10 and 10' for the pilot and copilot, respectively. The condition of each set of instruments 10 and 10' is noted by means of electrical impulse gauges 12 and 12', respectively. Incorporated into the gauges 12 and 12' are warning flags 14 and 14', respectively. Each of the gauges 12 and 12' contain a failure warning system which, upon an instrument failure, cause the warning flags 14 and 14', respectively, to come to the attention of the flight crew. Warning flag 14 operates only upon a failure in instruments 10 and likewise for flag 14' and instruments 10'.

Almost all instrument failures are monitored in the above in-line manner; however, there is a small number of instrument malfunctions which cannot be observed by this direct procedure. For this type of malfunction, an instrument comparator 16 is employed which is electrically connected between each of the sets of instruments 10 and 10' and their respective gauges 12 and 12'. The comparator 16 is well known in the art and commercially available. The purpose of the comparator 16 is to compare the readings of the duplicated instruments and if a deviation occurs, a warning appears on the annunciator thereby notifying the flight crew that one of the two identical instruments (pilot's or copilot's) is malfunctioning. This comparison type of failure warning system is employed only where the instrument failure cannot be discovered by other means.

Figure 2:
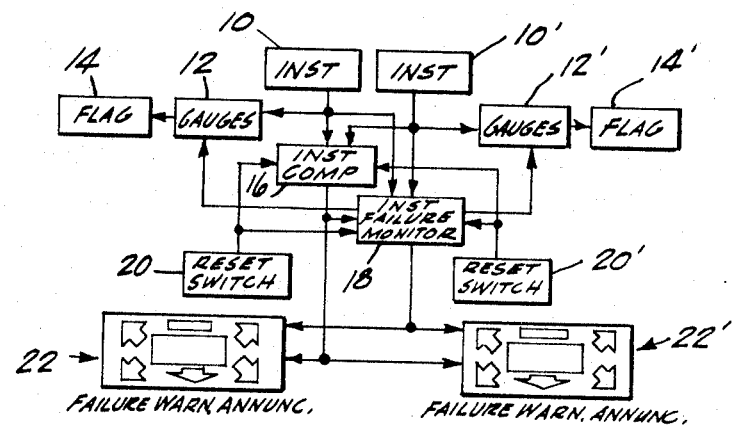
FIGURE 2 is a block diagram of the typical instrument failure warning device with the addition of the warning and monitoring device of the instant invention.

There is shown in FIGURE 2 of the drawings the failure warning monitor system of the instant invention employed in addition to the failure warning system of FIGURE 1. An instrument failure monitoring device 18 is installed to electrically monitor the instruments 10 and 10' and to monitor at all times the particular flight pattern of the aircraft. Upon an instrument malfunction the device 18 is able to analyze the failure of the particular instrument in view of the flight pattern at the time of the failure, and suggest to the flight crew a flight procedure to overcome the failure. A more detailed explanation of the monitoring device 18 will follow. The determination of the monitoring device is displayed to the flight crew by means of failure warning annunciators 22 and 22', one annunciator placed on the pilot's side of the aircraft and the other annunciator placed on the copilot's side of the aircraft.

Figure 3:
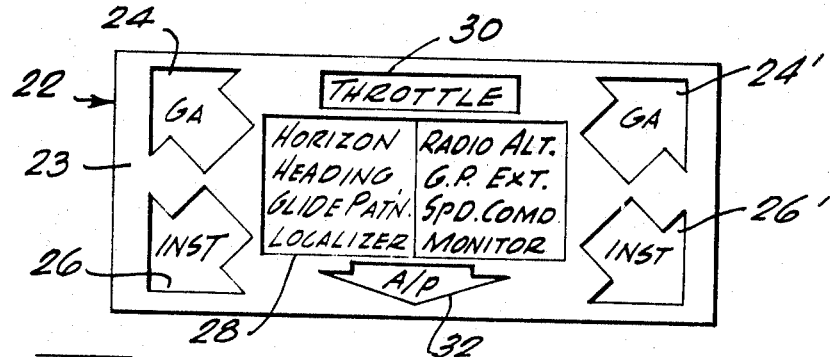
FIGURE 3 is an elevational view of the present failure warning annunciator as seen by the flight crew.

The annunciator is more clearly shown in FIGURE 3. The annunciator located on the pilot's side of the aircraft will be used for the purpose of explanation; however, the annunciator located on the copilot's side is identical and operates in the same manner. The annunciator is shown as being rectangularly shaped having four right-angled corners. The face 23 of the annunciator is constructed from an opaque material having areas of transparency. The areas of transparency are first arrow shaped areas 24, 24', 26, 26' located adjacent each of the four corners of the annunciator face 23, a first rectangular area 28 located approximately in the center of the annunciator face and being divided into eight smaller areas each containing written legends, a second rectangular area 30 located adjacent to and slightly above the first rectangular area 28, and a second arrow shaped area 32 located adjacent to and slightly below the first rectangular area 28.

The first arrow shaped areas 24 and 26 are adjacent to the upper and lower corners respectively of the left side of the annunciator (as the pilot views such). Arrow 24 points substantially in the upward direction and is used to designate a go-around maneuver (GA) for the aircraft during an approach for landing. Arrow 26 points substantially in the downward direction and is used to designate the instrument approaches (INST). The orrows 24 and 26 on both the pilot's and copilot's annunciator refer only to the operability or malfunction of the instruments on the pilot side of the aircraft. Arrows 24' and 26' located on the right hand portion of the annunciator refer identically to the above designations but for the copilot's instruments.

The arrow shaped transparent areas 24, 24', 26, 26' are adapted to display different lighting colors such as red or green. Each area is capable of displaying either red or green with red implying "stop" and green implying "go." It is to be understood that the color choice should in no way limit this invention as the colors were chosen merely because of their common everyday meaning of "stop" and "go."

The operation of the four arrows 24, 24', 26, 26' is as follows: As an example, if the aircraft is making a landing approach and an instrument necessary to complete the landing maneuver malfunction on the pilot's set of instruments, the in-line monitoring system detects of the malfunction and the arrow 26 will immediately light bright red and arrows 24, 24', and 26' will light bright green. The pilot immediately knowns that because arrow 26 is red, it is not safe to continue the approach, but a go-around maneuver may be executed since arrow 24 is green. However, the pilot can choose to allow the copilot to continue the approach since arrow 26' is green indicating all the copilot's instruments necessary for a safe approach landing are operating satisfactorily. If the instrument malfunction affects both the go-around maneuver and the approach landing, both arrows 24 and 26 will light red. Thereupon, the pilot may be forced to give control of the aircraft to the copilot. It is to be noted that the arrows 24, 24', 26, 26' are brought to the flight crew's attention (by either the red or green coloring) only upon a malfunction thereby only drawing attention to the annunciator when attention is desired. The arrows will remain illuminated until either or both of the reset switches 20 and 20' is operated.

The first rectangular area 28 located in the center of the annunciator face 23 contains a series of legends, preferably colored amber or orange, which are illuminated by the comparator unit only. Whenever a discrepancy between two identical instruments is detected by the comparator and the failure is not detected by the in-like monitoring, an electrical signal is sent to illuminate the appropriate legend. Since the monitor system cannot determine which system has failed in this case, the illuminated legend informs the pilot only that one of two identical instruments is malfunctioning.

Areas 30 and 32 are used to designate the automatic throttle control and automatic pilot, respectively. Each of these systems is not duplicated, but are only single units. If the automatic throttle control is not functioning properly, area 30 will appear bright red (or another suitable color) thereby notifying the flight crew that the throttle will have to be operated manually. Area 32 will appear bright red upon failure of the automatic pilot, and green, in some instances, if the automatic pilot is operating satisfactorily.

Once a failure has been brought to the attention of the flight crew, it is not necessary or desired for the annunciators to remain illuminated. Reset switches 20 and 20' are provided for the annunciators 22 and 22'; respectively, to remove the display from view. However, the instrument in-line monitoring device 18 retains the notice of the failure, and upon another failure situation, the monitoring device 18 will consider both failure situations before suggesting a corrective flight procedure.

Figure 4:
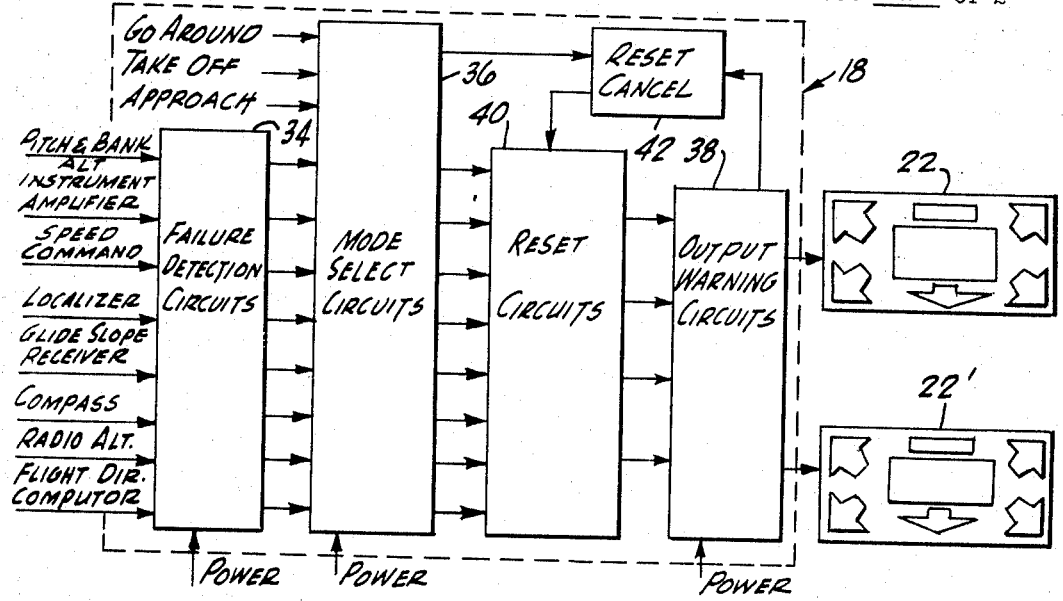
FIGURE 4 is a block diagram of the monitoring device employed in this invention.

The monitoring device 18 is more specifically shown in FIGURE 4. It is to be understood that the monitoring device 18 will be described as to function and not to specific circuitry since the specific circuit construction forms no part of this invention as many different and well known circuits could be constructed to accomplish the resulting function. The sets of instruments 10 and 10' when operating satisfactorily emit a signal for each particular instrument of a certain voltage. This signal is monitored by the failure detection circuits 34. Upon a loss of an instrument input signal, the failure detection circuits 34 emits an output signal corresponding to the particular instrument faliure. This signal is transmitted to the mode select circuits 36. The mode select circuits 36 are so constructed as to monitor the particular flight mode (go-around, take-off and approach) besides being controlled by each instrument signal from the failure detection circuits. It is to be noted that only the flight modes which are considered critical and demand quick and accurate responses from the pilot and copilot are monitored by the mode select circuits. The mode select circuits will pass an instrument failure signal only when the failure will affect the aircraft operation in the particular aircraft flight mode.

Once a failure warning signal has been transmitted by the mode select circuits, the signal is received by the output warning circuits 38 after first passing through a series of reset circuits 40. The output warning circuits 38 upon receiving the failure warning signal suggest a correct flight procedure to the pilot and copilot by means of the annunciator arrows 24, 24', and 26 and 26' as previously described. Once the failure has been brought to the attention of the pilot or copilot, it is desirable to have the display removed from view. Such is accomplished by means of the reset circuits 40 which are operated by the pilot and copilot through reset switches 20 and 20'.

The reset circuits 40 are constructed to provide a separate signal path for each instrument failure signal. If a failure warning signal is being transmitted through a circuit and either of the reset switches 20 or 20' is operated, the transmitting reset circuit becomes grounded (non-transmittable) thereby not displaying the failure by means of the annunciator. However, the failure signal is still being transmitted through the mode select circuits 36. It is desirable that upon a flight mode change or a new instrument failure, this non-transmittable circuit should be reactivated. To this end a reset canceling means 42 is provided which applies a negative voltage to the grounded reset circuit, thereupon reactivating this circuit for passage of the failure warning signal in view of the new flight mode or the new failure situation.

Figure 5:
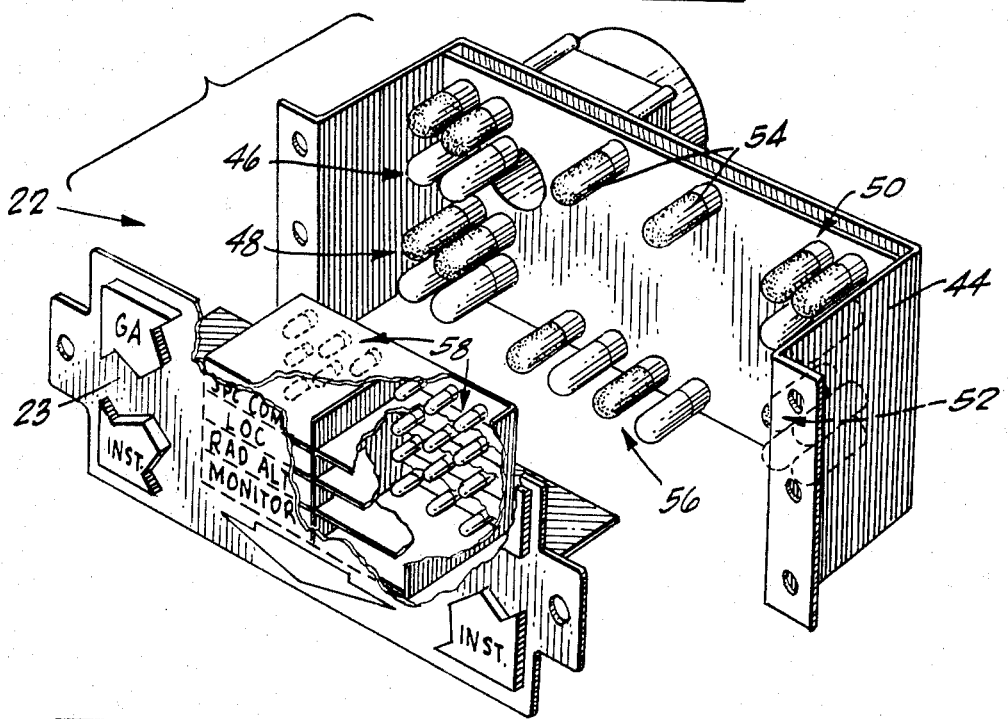
FIGURE 5 is a pictorial view of the annunciator assembly.

The specific construction of the annunciator is more clearly shown in FIGURE 5. The face 23 of the annunciator is mounted on enclosure 44. Mounted in enclosure 44 are sets of electric light bulbs 46, 48, 50, 52, 54, 56 and 58. Sets of bulbs 46, 48, 50 and 52 are mounted in the four corners of the enclosure 44 with bulbs 46 in the upper left hand corner, bulbs 48 in the lower left hand corner, bulb 50 in upper right hand corner and bulbs 52 in lower right hand corner. Bulbs 46, 48, 50 and 52 are adapted to only illuminate the corresponding transparent arrow shaped areas 24, 26, 24', 26' of the annunciator face 23. In each set of bulbs 46, 48, 50, and 52 there are four bulbs, two of a red color and two green. However, it is to be understood that bulbs other than these colors could be employed without departing from the scope of this invention. Multiple bulbs are employed because if one bulb in the set burns out, there is always another bulb of that color to be illuminated. Bulbs 54 are both red colored and used to illuminate area 30 denoting a failure of the automatic throttle. Bulbs 56 are two red and two green illuminating area 32 and denoting failure and satisfactory operation, respectively, of the autopilot. Bulbs 58 are of a smaller size than the other bulbs and are used to illuminate area 28 denoting instrument deviations from the comparator. Usually eight legends are employed in area 28 with three bulbs to each legend, the bulbs being of an amber or orange color. The illumination of areas 28, 30 and 32 by bulbs 58, 54 and 56, respectively, are for purposes of convenience and the placing of all possible failure displays into one annunciator, however, this portion of the device is not part of the present invention.

The instrument monitor system is in operation continuously for normal flight, and priority logic is also provided to allow warnings only on instruments which is necessary for the task at hand. This eliminates nuisance warnings which may be distracting when operating the aircraft at low altitudes. Priority logic allows portions of the monitor system to be in operation for normal flight and deactivates other portions when the proper flight mode is selected. The switching priority of the priority logic is automatic for the takeoff, cruise, approach, and go-around flight modes.

I claim:

1. An instrument failure monitor and warning system for use in an aircraft, comprising:
   a plurality of instruments;
   a monitoring device coupled to said instruments, said monitoring device, being capable of detecting failure in said instruments, including:
      failure detection circuit means for emitting a signal corresponding to an instrument failure;
      flight mode monitoring circuit means for receiving all instrument failure signals from said failure detection circuit means and for transmitting only those signals which affect the particular mode in which the aircraft is operating;
      output circuit means for receiving an instrument failure warning signal from said flight mode monitoring circuit means and for transmitting an output signal to suggest a corrective flight procedure in view of each flight instrument failure; and
   annunciator means, coupled to said output circuit means, for displaying said output signal to suggest a corrective aircraft flight procedure in view of an instrument failure.

2. An aircraft flight instrument failure monitor and warning system comprising:
   multiple identical sets of electrically operating aircraft flight instruments;
   an instrument gauge electrically connected to each instrument in said multiple identical sets, said gauges showing the operation of each instrument;
   a monitoring device electrically connected to the multiple sets of instruments and adapted to monitor the operation of each instrument in each set, said monitoring device being so constructed to be capable of suggesting to the flight crew a correct and safe flight pattern of the aircraft in view of an instrument failure or failures; and
   annunciator means electrically connected to said monitoring device, said annunciator means displaying to the flight crew the suggested flight pattern of said monitoring device.

3. An aircraft flight instrument failure monitor and warning system of claim 2 including:
   an instrument comparator electrically operating between said multiple sets of instruments, said comparator adapted to compare the operation of each instrument in one set of instruments with the identical instrument in another set of instruments whereby said comparator observes deviations between identical instruments; and
   said comparator being electrically connected to said monitoring device whereby said monitoring device displays on said annunciator means any deviation observed by said comparator.

4. An aircraft flight instrument failure monitor and warning system of claim 2 including:
   reset switch means electrically connected to said annunciator means whereby upon operation of said reset switch means the failure warning display of the annunciator is removed from view.

5. An aircraft flight instrument failure monitor and warning system comprising:
   a first set of electrically operating aircraft flight instruments;
   a second set of electrically operating aircraft flight instruments, said second set of flight instruments being a duplicate of said first set of flight instruments, both sets of instruments being installed in an aircraft in a parallel relation, one set for the pilot and one set for the copilot, said sets of instruments having instrument gauges adapted to be viewed by the pilot and copilot, said gauges incorporating instrument failure warning means;

an instrument comparator electrically operating between said first and second sets of instruments, said comparator comparing the operation of each instrument in said first set of instruments with its counterpart in said second set of instruments, said comparator being electrically connected to said failure warning means whereby the warning means is activated by the comparator upon deviation of the readings of any of the duplicated instruments;

the improvement comprising:

an instrument failure monitor device which monitors said first and second sets of flight instruments and said instrument comparator, said monitor device being capable of suggesting a proper flight pattern or corrective action in view of an instrument failure;

failure warning annunciator means electrically connected to said monitor device and being adapted to display any and all instrument failures detected by said monitor device, said annunciator means including two separate annunciators, one annunciator adapted to be viewed by the pilot and the other annunciator adapted to be viewed by the copilot, said annunciators being capable of displaying a suggested flight pattern upon an instrument failure; and reset switch means located adjacent said annunciators, said reset switch means being adapted to be operated by the pilot and copilot to remove from view, when desired, the failure warning display on each annunciator.

6. In combination with an aircraft having a plurality of flight instruments, an instrument failure monitoring and warning system comprising:

a monitoring device coupled to said instruments, said monitoring device including:
  failure detection circuit means for emitting a signal corresponding to an instrument failure;
  flight mode monitoring circuit means for receiving all instrument failure signals from said failure detection circuit means and for transmitting only those signals which affect the particular mode in which the aircraft is operating;
  output circuit means for receiving an instrument failure warning signal from said flight mode monitoring circuit means and for transmitting an output signal to suggest a corrective aircraft flight procedure in view of each flight instrument failure;
  reset circuit means for controlling transmission and nontransmission of said instrument failure signals to said output circuit means;
  reset switch means for deactivating said reset circuit means thereby making said reset circuit means nontransmittable; and
  reset cancel means for reactivating said reset circuit means upon a flight mode change or upon an additional instrument failure warning signal; and
annunciator means, coupled to said output circuit means, for displaying said output signal to suggest a corrective aircraft flight procedure.

References Cited
UNITED STATES PATENTS

| | | | |
|---|---|---|---|
| 2,671,208 | 3/1954 | Lamb | 340—253 |
| 2,799,846 | 7/1957 | Negrin et al. | 340—253 XR |
| 3,252,137 | 5/1966 | Montgomery | 340—251 XR |

ALVIN H. WARING, Primary Examiner.

U.S. Cl. X.R.

340—248, 253